United States Patent Office 2,799,612
Patented July 16, 1957

2,799,612

CONTROL OF NEMATODES USING CHLORINATED QUEBRACHO

Philip H. Santmyer, Robertson, Mo., assignor to Monsanto Chemical Company, St. Louis, Mo., a corporation of Delaware No Drawing. Application December 7, 1953,
Serial No. 396,785

3 Claims. (Cl. 167—24)

This invention relates to methods of inhibiting both the endoparasitic and ectoparasitic nematodes, and other parasitic worm life which exist in the soil at some stage of their life cycles, for example eggs, larvae and adult worm. The invention is more particularly directed to providing chemicals for treating the normal environment of the parasitic worms.

The control of nematodes and other parasitic worms in soils is a complex problem because of the paucity of information on the physiology of the worms and the difficulty involved in experimentation with microscopic organisms. It is believed that many toxicants operate by the destruction of vital enzymes within the organism, however many compounds, known to be capable of reaction with enzymes, are of little effect, because of the impermeable membranes which enclose the eggs, larvae and adult parasitic worms. Some agents having fat solvency properties are known to penetrate the exterior membranes by action on fatty tissues, but such penetration will not usually kill the organism. The effective toxicant must have both the property of penetrating the resistant coatings and the ability to kill.

Even compounds which have the requisite properties of penetration and toxicity are frequently useless because it is necessary that the toxicant be applied to the environment in such a way that it comes into intimate contact with the organism. Furthermore it is necessary that it remain in the soil for a substantial period of time to effect a substantially complete kill of parasitic worms. For example, many active compounds are of limited water-solubility and volatility and therefore are difficult to disperse intimately in the soil. Furthermore, compounds of excessive volatility may be evolved from the soil before a sufficient number of the organisms are destroyed.

Even the ability to destroy nematodes and endoparasitic worms in the soil will not definitely characterize a successful soil sterilant. Many compounds toxic to animal life are also phytotoxic, and therefore if they are to be practicable as parasitic worm toxicants, the phytotoxicity must not be long-lived. The phytotoxic substances either in the form of the substance added or as decomposition residues should be such that they are removed from the soil by evaporation, by rain washing, or by soil bacterial decomposition.

For the reasons set forth above, completely effective agents for nematodes and other parasitic worm life are not generally available. Furthermore one skilled in the art cannot predict the effectiveness as practicable toxicants of compounds, even though the physical and biological properties of the compounds are well known.

Since a very careful balance of physical and chemical properties is required in order to provide a chemical substance useful in controlling nematodes and other parasitic worms, this invention has for its principal purpose the provision of compounds which have the above described requisite properties. A further purpose of this invention is to provide a useful method of freeing soils from objectionable nematode life. Other purposes of this invention will be evident from the following specification.

It has now been found that a very effective nematode and endoparasitic worm controlling agent may be prepared by the chlorination of quebracho, which is the bark of one of a family of trees indigenous to South America. The quebracho useful in the preparation of the chlorinated products may also be an extract or concentrate of the tannins found in the quebracho bark. The new product is prepared by treating the quebracho with chlorine until a substantial amount has been absorbed. The utility of the chlorinated quebracho will depend to some extent upon the extent of chlorination and upon the concentration of tannin present. Thus even slightly chlorinated products are useful, but the efficient use involves products with from 5 to 20 percent chlorine.

The use of the chlorinated quebracho is especially advantageous since it possesses much less phytotoxicity than other known worm toxicants. Furthermore it appears to be non-toxic to domestic animals and therefore is of special utility in the sterilization of soils on farms and especially in barnyards, which are very frequently infected with the soil phases, eggs and larvae, of the helminths. The chlorinated quebracho is easy to use since it is a lightweight solid which is readily water-soluble. For this reason it can be dispersed in soil by cultivating or it can be applied dissolved in irrigation water or as an aqueous soil drench. Since it does not possess the usual properties of known nematocides, its effectiveness appears to be based on an entirely different principle, which is not completely understood.

The chlorinated quebracho can be effectively applied to soils at concentrations varying from 75 to 1,000 lbs. per acre, the optimum level depending upon the extent of infestation and the degree of nematode elimination desired. Preferred rates of application are from 200 to 400 lbs. per acre. When used as a solid additive it may be spread by a fertilizer applicator either alone or admixed with fertilizer, lime, or other solid soil additives and then dispersed in the soil by a mechanical mixing device, for example a conventional agricultural cultivator.

The chlorinated quebracho may be used to control nematodes and other parasitic worms in environment other than the soil. Synthetic soils frequently used in greenhouses may require treatment for parasite infection. Also roots, cuttings, tubers, bulbs and seeds may become infected and require a rinse of the toxicant to remove and destroy the parasitic worms and their eggs and larvae. In controlling the endoparasitic worms the body of the host may be the environment treated by internal medication, which use of chlorinated quebracho is possible due to the slight toxicity to domestic animals and fowl.

Further details of the practice of this invention are set forth with respect to the following examples.

Example 1

A chlorinated quebracho containing 10.6 percent chlorine by weight was first screened by treating aqueous dispersions of adult nematodes with various percentages ranging from 0.1 percent to 0.001 percent and measuring the rate at which the nematodes were eliminated. It has been found that in an aqueous suspension the adult nematode flexes his body at a regular rate, which flexure is readily visible with the aid of a microscope. In contact with a nematocide the rate of flexure, or motility, gradually reduces and by making observations at various time intervals the course of the nematocidal action may be conveniently followed. The following table reports the percent of normal motility which the nematode possesses at various time intervals when affected by various concentrations of chlorinated quebracho.

TABLE I

|  | 0.1% Conc. | 0.01% Conc. | 0.001% Conc. |
|---|---|---|---|
| Motility at— | | | |
| 10 min | 100 | 100 | 100 |
| 20 min | 100 | 100 | 100 |
| 30 min | 75 | 100 | 100 |
| 1 hr | 25 | 100 | 100 |
| 2 hrs | 0 | 50 | 90 |
| 24 hrs | 0 | 0 | 0 |

Secondary screening tests were made using soil cultures of nematodes in which tomato plants were established. At concentrations of 0.1 percent and 0.01 percent plants grown to maturity bore no evidence of nematode infestation or phytotoxicity.

Example 2

In another series of replicated growing tests the degree of infestation was determined by counting the galls appearing in the root system of tomato plants. The number of galls appearing in each treated plot and the number in the untreated control plots are set forth in the following table.

TABLE II

| Plots | Control | | 2,000 lbs./A 6″ 0.1% Conc. | | 200 lbs./A 6″ 0.01% Conc. | |
|---|---|---|---|---|---|---|
|  | No. Galls | Percent Infestation | No. Galls | Percent Infestation | No. Galls | Percent Infestation |
| 1 | 175 | 100 | 25 | 13.3 | 25 | 13.3 |
| 2 | 250 |  | 0 | 0 | 25 | 13.3 |
| 3 | 150 |  | 0 | 0 | 25 | 13.3 |
| 4 | 150 |  | 0 | 0 | 100 | 53.3 |
| 5 | 200 |  | 25 | 13.3 | 75 | 40.0 |
| 6 | 175 |  | 25 | 13.3 | 50 | 26.0 |
| 7 | 150 |  | 0 | 0 | 0 | 0 |
| 8 | 250 |  | 0 | 0 | 25 | 13.3 |
| Ave | 187 | 100 | 9.3 | 5.0 | 40.7 | 21.6 |

Example 3

In large scale growing tests conducted in a peanut growing area infected with the sting nematode (*Belonolaimus gracilis*) replicated growing experiments using 100 lbs. per acre of chlorinated quebracho yielded 11.88 lbs. of peanuts per plot. At the same time under identical replicated conditions the untreated plots yielded 9.14 lbs.

Example 4

In a different area infested with root-knot nematode (*Meloidogyn hapla*) replicated experiments showed that chlorinated quebracho treatments of 100 lbs. per acre resulted in the production of 21.44 lbs. of peanuts per plot. Under identical replicated conditions the untreated control plots yielded 18.66 lbs.

What is claimed is:

1. A method of controlling endoparasitic worms which comprises treating soils infected with the said worms with a toxic amount of chlorinated quebracho containing an effective quantity of chlorine.

2. A method of controlling endoparasitic worms which comprises treating soils infected with the said worms with a toxic amount of chlorinated quebracho containing from five (5) to twenty (20) percent by weight of chlorine.

3. A method of destroying nematodes which comprises dispersing in soil infected with nematodes from 200 to 400 pounds per acre of a chlorinated quebracho containing an effective quantity of chlorine.

References Cited in the file of this patent

FOREIGN PATENTS 160,039    Great Britain _____ Mar. 17, 1921

OTHER REFERENCES

Sohn: Chemical Abstracts, vol. 47, Sept. 10, 1953, p. 9005.